United States Patent
Murata (10) Patent No.: US 10,222,223 B2
(45) Date of Patent: Mar. 5, 2019

(54) TRAFFIC INFORMATION OUTPUT SYSTEM AND TRAFFIC INFORMATION OUTPUT METHOD

(71) Applicant: HONDA MOTOR CO., LTD., Tokyo (JP)

(72) Inventor: Satoshi Murata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/384,915

(22) Filed: Dec. 20, 2016

(65) Prior Publication Data

US 2017/0176203 A1 Jun. 22, 2017

(30) Foreign Application Priority Data

Dec. 22, 2015 (JP) ................................. 2015-250673

(51) Int. Cl.
*G08G 1/01* (2006.01)
*G01C 21/34* (2006.01)

(52) U.S. Cl.
CPC ....... *G01C 21/3492* (2013.01); *G08G 1/0129* (2013.01)

(58) Field of Classification Search
CPC ............ G01C 21/3492; G01C 21/3415; G01C 21/36; G01C 21/3617; G01C 21/362; G08G 1/0129
See application file for complete search history.

(56) References Cited

U.S. PATENT DOCUMENTS

| 6,317,686 B1* | 11/2001 | Ran | G01C 21/3691 701/117 |
| 7,176,813 B2* | 2/2007 | Kawamata | B60R 11/04 340/905 |
| 7,525,451 B2* | 4/2009 | Yoshikawa | G01C 21/3492 340/995.11 |
| 7,739,040 B2* | 6/2010 | Horvitz | G01C 21/3492 701/414 |
| 8,086,403 B2* | 12/2011 | Ishikawa | G08G 1/096811 340/988 |

(Continued)

FOREIGN PATENT DOCUMENTS

| JP | 2007-086087 A | 4/2007 |
| JP | 2013-525769 A | 6/2013 |

OTHER PUBLICATIONS

Japanese Office Action application No. 2015-250673 dated Sep. 11, 2018.

*Primary Examiner* — Nicholas Kiswanto
(74) *Attorney, Agent, or Firm* — Squire Patton Boggs (US) LLP (57) ABSTRACT

There is provided a traffic information output system capable of reducing or eliminating the burden on a user when the searched route and the traffic information on the route are outputted. The traffic information output system comprises a moving cost prediction unit 213 which predicts a moving cost of the route according to a reference time point indicated in a change pattern, and a moving cost output control unit 214 which outputs, to the output device, the prediction moving cost and change time point interfaces P27 and P28 for outputting a prediction moving cost which is a moving cost predicted according to a post-change reference time point.

6 Claims, 8 Drawing Sheets

(56) References Cited

U.S. PATENT DOCUMENTS

| | | | | |
|---|---|---|---|---|
| 8,204,640 B2* | 6/2012 | Tani | ............... | B60K 6/445 |
| | | | | 180/65.265 |
| 8,290,695 B2* | 10/2012 | Hiestermann | ......... | G01C 21/32 |
| | | | | 701/119 |
| 8,296,062 B2* | 10/2012 | Yamane | ............. | G01C 21/3694 |
| | | | | 701/423 |
| 2005/0222763 A1* | 10/2005 | Uyeki | ................ | G01C 21/3492 |
| | | | | 701/423 |
| 2006/0247954 A1* | 11/2006 | Hunt | .................... | G06Q 10/02 |
| | | | | 705/5 |
| 2013/0204527 A1* | 8/2013 | Schilling | ................ | G01C 21/34 |
| | | | | 701/533 |
| 2013/0275046 A1* | 10/2013 | Shimizutani | ......... | G01C 21/203 |
| | | | | 701/533 |
| 2015/0025783 A1* | 1/2015 | Sechny | ................. | G01C 21/34 |
| | | | | 701/117 |
| 2017/0052036 A1* | 2/2017 | Uno | ................... | G01C 21/3492 |
| 2017/0122753 A1* | 5/2017 | Yanagihara | ......... | G01C 21/3484 |

\* cited by examiner

TRAFFIC INFORMATION OUTPUT SYSTEM AND TRAFFIC INFORMATION OUTPUT METHOD

BACKGROUND OF THE INVENTION

Field of the Invention

The present invention relates to a traffic information output system and a traffic information output method, and more particularly to a device which outputs a searched route and traffic information on the route.

Description of the Related Art

Japanese Patent Laid-Open No. 2007-86087 proposes a navigation device as a traffic information output system, which searches a route based on information including a start time point specified by an operator (driver of a vehicle), calculates an predicted travel time in a case where the vehicle travels on the searched route and a moving cost in a case where the vehicle travels on the searched route without congestion, and displays the searched route and a moving cost difference which is a difference between the predicted travel time and the moving cost on a display portion.

This navigation device displays the moving cost difference on the display portion thereby to allow the operator to perceive the travel time increased or decreased due to congestion. This navigation device can also give the operator an opportunity to search for another route to avoid congestion.

The technique disclosed in Japanese Patent Laid-Open No. 2007-86087 may, however, bother the operator to specify a start time point by entering the start time point when the operator searches for another route again.

In view of the above, the present invention has been made, and an object of the present invention is to provide a traffic information output system and a traffic information output method capable of reducing or eliminating the burden on the user when the searched route and the traffic information on the route are outputted.

SUMMARY OF THE INVENTION

A traffic information output system of the present invention comprises:
an input device and an output device;
a storage unit which stores a change pattern of a moving cost for each time span;
an input information recognition unit which recognizes a reference time point entered via the input device and route determination information for determining a route;
a moving cost prediction unit which predicts the moving cost of the route according to the reference time point indicated in the change pattern; and
a moving cost output control unit which outputs, to the output device, the predicted moving cost, and a change time point interface for outputting a prediction moving cost which is a moving cost predicted according to a post-change reference time point obtained by shifting the reference time point by a specified time.

The traffic information output system of the present invention allows a user of the traffic information output system to recognize a moving cost predicted according to a post-change reference time point obtained by a simple method of shifting the reference time point by a specified time via a change time point interface. Thus, this traffic information output system can reduce or eliminate the burden on the user when the searched route and the moving cost on the route are outputted.

In the traffic information output system of the present invention,
the moving cost prediction unit is preferable to calculate a change interval based on the change pattern so that a maximum value of an increase or decrease in prediction moving cost in some or all areas of the route is equal to or greater than a predetermined first threshold value, and
to recognize a time point which is the change interval earlier or later than the reference time point, as the post-change reference time point.

The thus configured traffic information output system calculates the change interval so that the maximum value of an increase or decrease in prediction moving cost is equal to or greater than a predetermined first threshold value and recognizes a time point of the reference time point before or after the change interval as the post-change reference time point. This can avoid selecting a change interval with little change in moving cost.

In the traffic information output system of the present invention,
the moving cost prediction unit is preferable to calculate a change interval based on the change pattern so that a maximum value of an increase or decrease in prediction moving cost which is a moving cost predicted in some or all areas of the route is equal to or less than a predetermined second threshold value and
to recognize a time point which is the change interval earlier or later than the reference time point, as the post-change reference time point.

The thus configured traffic information output system calculates the change interval so that the maximum value of an increase or decrease in prediction moving cost is equal to or less than a predetermined second threshold value and recognizes a time point of the reference time point before or after the change interval as the post-change reference time point. This can avoid selecting a change interval with violent fluctuations in prediction moving cost.

In the thus configured traffic information output system,
the moving cost prediction unit is preferable to be configured to recognize a time point closest to the reference time point out of the time points having a predetermined change in prediction moving cost in some or all areas of the route as the post-change reference time point.

It is inferred that when a user attempts to change the reference time point, the user is seeking a change in the moving cost. The thus configured traffic information output system recognizes a time point having a predetermined change in moving cost of the route as the post-change reference time point based on the change pattern. When the user changes the reference time point to the post-change reference time point via the change time point interface according to this post-change reference time point, the moving cost according to the post-change reference time point is displayed. The moving cost according to the post-change reference time point is a moving cost with a predetermined change from the moving cost according to the initial reference time point, and thus is highly likely to follow the intent of the user.

In addition, out of the time points having such changes in moving cost as described above, the time point closest to the reference time point is selected as the post-change reference time point. This can avoid selecting a time point having a large gap from the reference time point specified by the user as the post-change reference time point, and thus can reduce or eliminate a sense of discomfort experienced by the user.

In the thus configured traffic information output system, the moving cost prediction unit is preferable to select a time point closest to the reference time point out of the time points where a prediction moving cost in some or all areas of the route is equal to or less than a predetermined third threshold value as the post-change reference time point based on the change pattern.

The thus configured traffic information output system can change the reference time point following the desire of the user desiring a change where the prediction moving cost is equal to or less than the third threshold value.

In the thus configured traffic information output system, the moving cost prediction unit is preferable to select a time point closest to the reference time point out of the time points where a prediction moving cost in some or all areas of the route is reduced by a predetermined fourth threshold value or more as the post-change reference time point.

The thus configured traffic information output system can change the reference time point following the desire of the user desiring a reduction in predetermined prediction moving cost.

A traffic information output method of the present invention, executed by a traffic information output system comprising:

an input device and an output device; and a storage unit which stores a change pattern of a moving cost for each time span, the traffic information output method comprising:

an input information recognition step of recognizing a reference time point entered via the input device and route determination information for determining a route;

a moving cost prediction step of predicting the moving cost of the route according to the reference time point indicated in the change pattern; and a moving cost output control step of outputting, to the output device, the prediction moving cost and a change time point interface for outputting a prediction moving cost which is a moving cost predicted according to a post-change reference time point obtained by shifting the reference time point by a specified time.

DETAILED DESCRIPTION OF THE PREFERRED EMBODIMENTS

With reference to FIGS. 1 to 6A, a first embodiment of the traffic information output system of the present invention will be described.

(Configuration of Route Search System)

Figure 1:
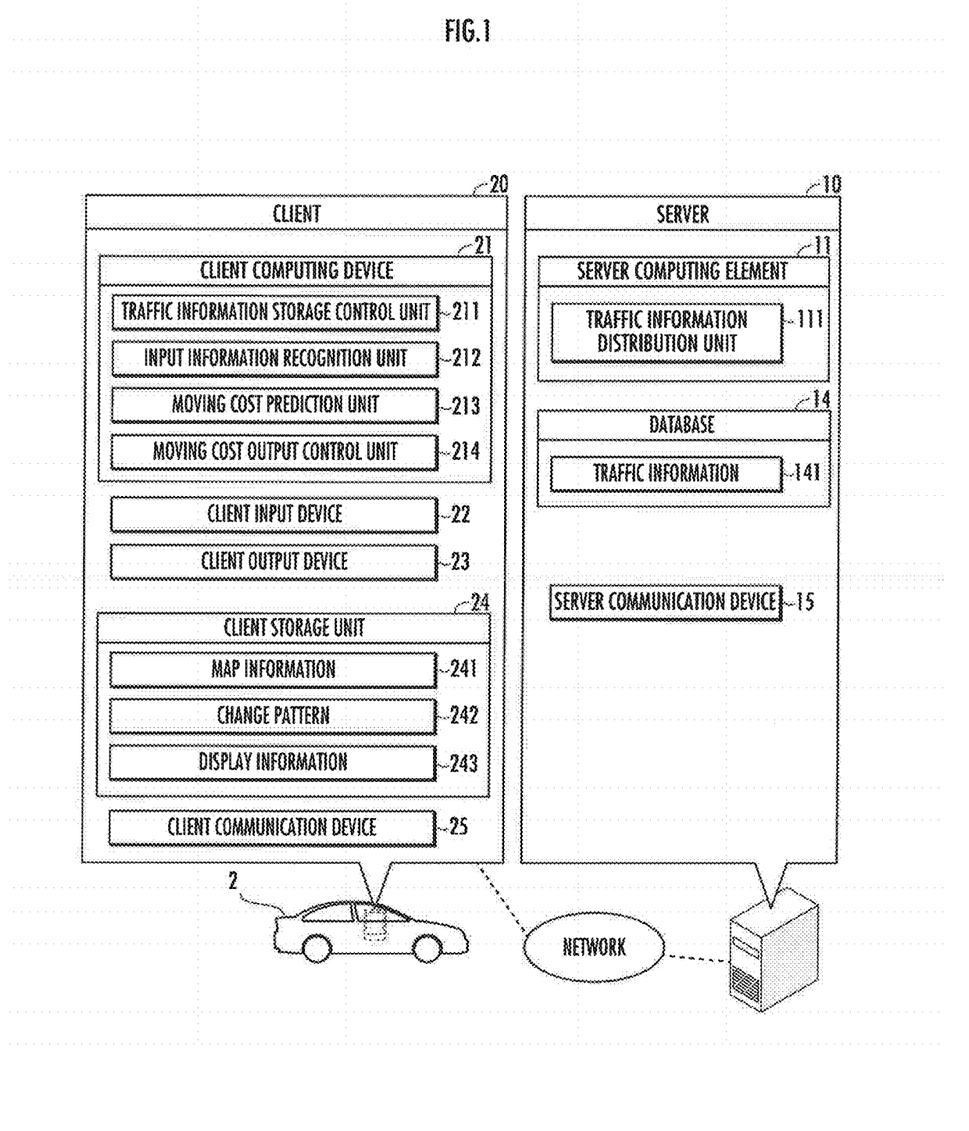
FIG. 1 is an entire configuration view of a traffic information output system.

As illustrated in FIG. 1, the traffic information output system includes a server 10 and a client 20 installed in the moving body 2, which are mutually connected via a network.

(Configuration of Server)

The server 10 includes a server computing element 11, a database 14, and a server communication device 15. Note that some or all of the computers constituting the server 10 may include a computer constituting the client 20. For example, some or all of the server 10 may include one or more clients 20 as mobile stations.

The server computing element 11 includes, for example, a processor such as a CPU. The server computing element 11 serves as a traffic information distribution unit 111 which executes a computing process described later by executing a predetermined program read from a storage device such as a memory or a hard disk drive. The server computing element 11 may include a single processor or a plurality of mutually communicable processors.

The database 14 includes, for example, storage devices such as a read only memory (ROM), a random access memory (RAM), and a hard disk drive (HDD). The database 14 is configured to store the results computed by the server computing element 11 or data received by the server computing element 11 via the server communication device 15.

The database 14 stores traffic information 141 on a moving cost at each time point for each area. The present embodiment describes the time required to pass through an area as a moving cost, but alternatively or additionally to this, charge, fuel consumption, or electricity cost may be used.

The server communication device 15 includes a communication device which is connected to a public telecommunications network (such as the Internet) as a network and communicates with an external terminal (such as the client 20).

(Configuration of Client)

The client 20 includes an information terminal (e.g., a mobile phone) such as a tablet terminal and a smartphone, whose size, shape, and weight are designed so as to be carried by the user. The client 20 may include an information terminal (e.g., a navigation device) whose size and the like are designed so as to be installed in the moving body 2 in which a user of the client 20 is traveling. Alternatively, the client 20 may include a plurality of information terminals which have different functions from each other and cooperate with each other, such as a mobile phone having a communication function and a navigation device having an input function and an output function.

The client 20 includes a client computing device 21, a client input device 22, a client output device 23, a client storage unit 24, and a client communication device 25.

The client computing device 21 includes a processor such as a CPU. The client computing device 21 has a traffic information output app installed therein to perform route search. When the traffic information output app is activated, the client computing device 21 is configured to serve as a traffic information storage control unit 211, an input information recognition unit 212, a moving cost prediction unit 213, and a moving cost output control unit 214, which execute computing processes described later. The client computing device 21 may include a single processor or a plurality of mutually communicable processors.

The client computing device 21 serves as a user interface manager (UIM) such as adjusting display content on a touch panel according to the type of touch gesture of the user on the touch panel. Examples of the touch gesture include a tap (a single tap, a double tap, and a long tap), a flick (an upper flick, a lower flick, a left flick, and a right flick), a swipe, a pinch (pinch in and pinch out), and a multi-touch.

The client input device 22 includes a position input device such as a touch pad. The client output device 23 includes a display device such as a liquid crystal panel. The touch panel includes a combination of both devices. In other words, the touch panel can individually serve as an input interface and an output interface. The touch panel displays a function image corresponding to a function of an application software (app) installed in the client 20.

The client input device 22 may alternatively or additionally include a sensing device which senses the type of a user input operation (speech content or gesture) by a non-contact system such as an audio input device (microphone) and an imaging device. The client output device 23 may additionally include an audio output device (speaker). If the client input device 22 can identify a user gesture (movement of facial expressions and movement of body parts such as fingertips or arms) by a non-contact system such as an imaging device, the client computing device 21 can sense the type of the gesture as the type of input operation.

The client storage unit 24 includes a storage device such as a read only memory (ROM), a random access memory (RAM), and a hard disk drive (HDD). The client storage unit 24 stores map information 241, a change pattern 242, and display information 243. Note that the client storage unit 24 of the present embodiment corresponds to the "storage unit" of the present invention.

The map information 241 is general map information including a plurality of links.

The change pattern 242 is information on a change pattern of a past moving cost at each point, which is updated by a traffic information acquisition process described later.

The display information 243 is information for configuring a screen displayed by the client output device 23.

The client communication device 25 is configured to communicate to and from an external terminal such as the server 10 via a public telecommunications network (such as the Internet) as a network according to a communication standard suitable for wireless communication at a long distance such as WiFi (registered trademark).

In addition, the client 20 is configured to be connected to the moving body 2 so as to be able to receive, from the moving body 2, position information measured by a positioning device such as a global positioning system (GPS). Alternatively or additionally to this, the client 20 may have a self-position measurement function with the use of GPS or the like.

(Traffic Information Acquisition Process)

Figure 2:
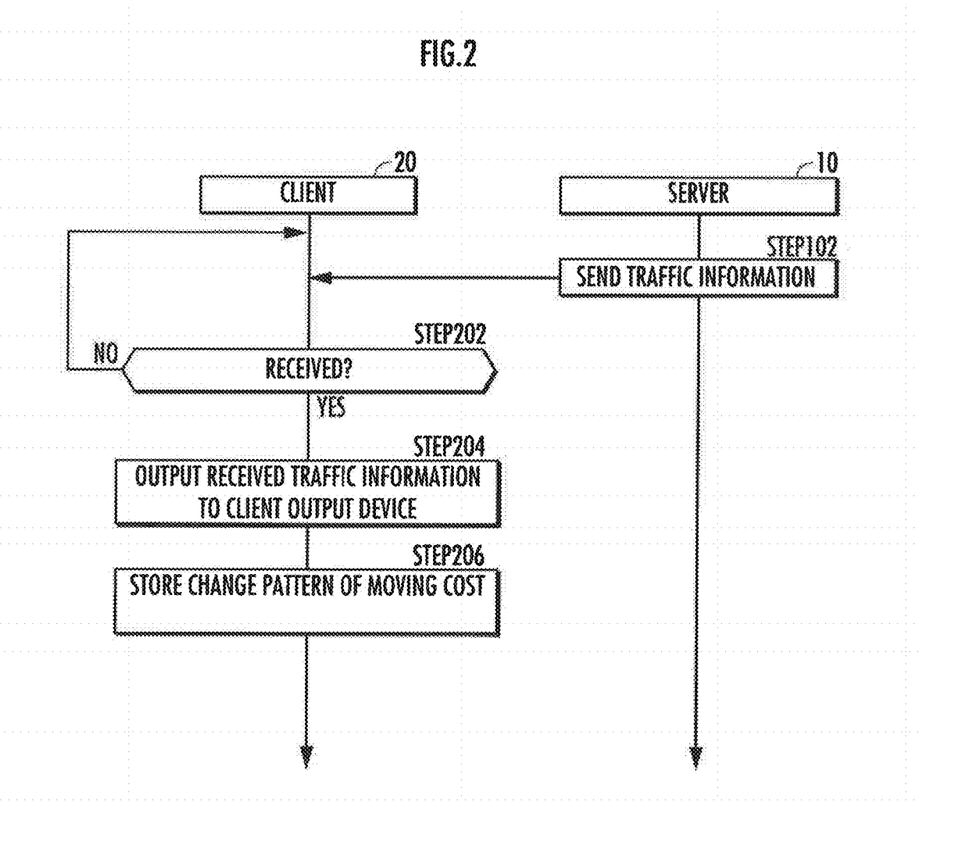
FIG. 2 is a flowchart of a traffic information acquisition process.

With reference to FIG. 2, the traffic information acquisition process will be described.

The traffic information distribution unit 111 of the server 10 delivers the latest traffic information 141 at each point at regular time intervals to the client 20 (STEP 102 in FIG. 2).

The traffic information storage control unit 211 of the client 20 determines whether or not to receive the traffic information 141 from the server 10 through the client communication device 25 (STEP 202 in FIG. 2). If the determination result is negative (NO in STEP 202 in FIG. 2), the traffic information storage control unit 211 executes the process of STEP 202 in FIG. 2 again.

If the determination result is positive (YES in STEP 202 in FIG. 2), the traffic information storage control unit 211 outputs the received traffic information 141 to the client output device 23 (STEP 204 in FIG. 2).

The traffic information storage control unit 211 adds and stores the change pattern of the moving cost identified from the received traffic information 141 to and in the change pattern 242 of the moving cost stored in the client storage unit 24 (STEP 206 in FIG. 2).

The change pattern 242 is accumulated by the above described process.

Note that additionally or alternatively to the traffic information acquisition process, the change pattern 242 may be accumulated by reading the change pattern 242 from a CD-ROM or the like or by collecting the traffic information by the moving body 2.

(Traffic Information Output Process)

Next, with reference to FIG. 3, the traffic information output process will be described.

Figure 3:
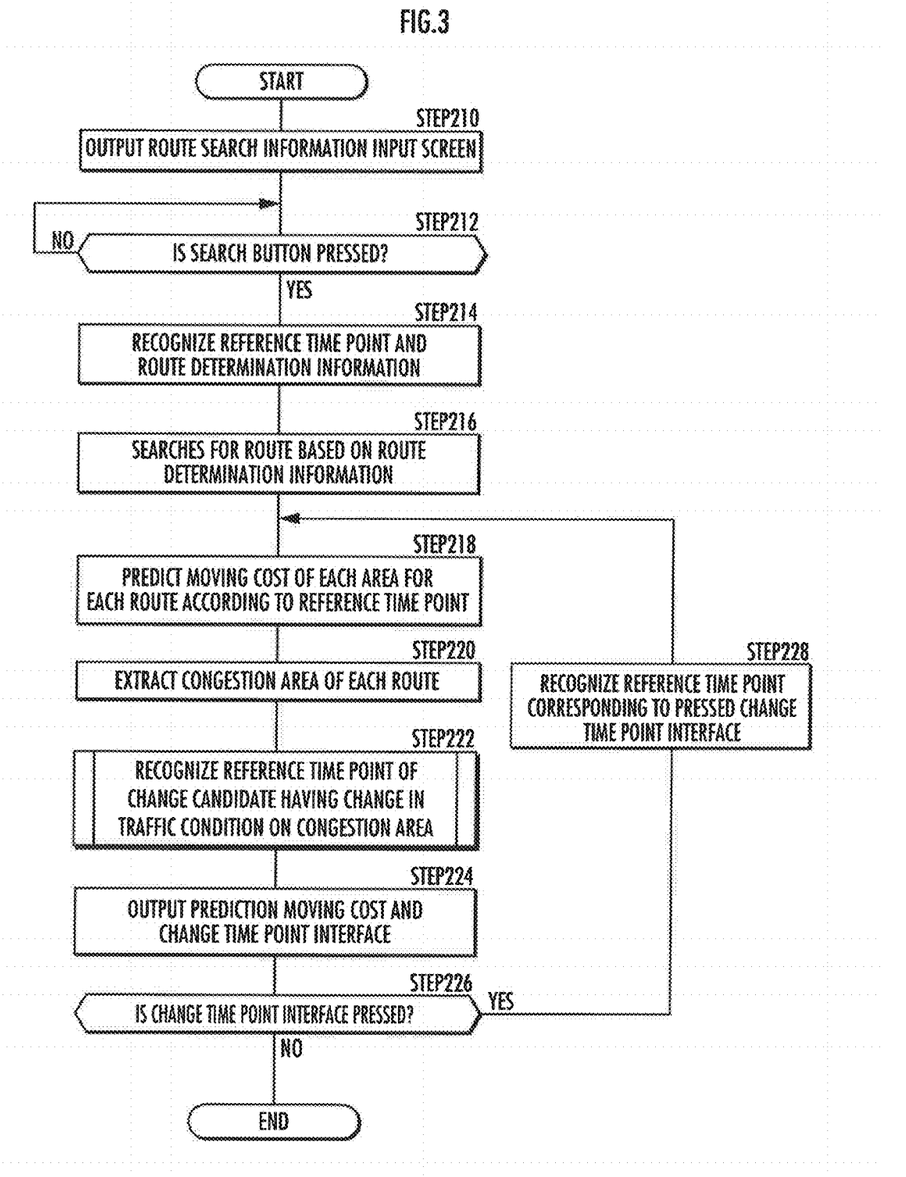
FIG. 3 is a flowchart of a traffic information output process.
Figure 4A:
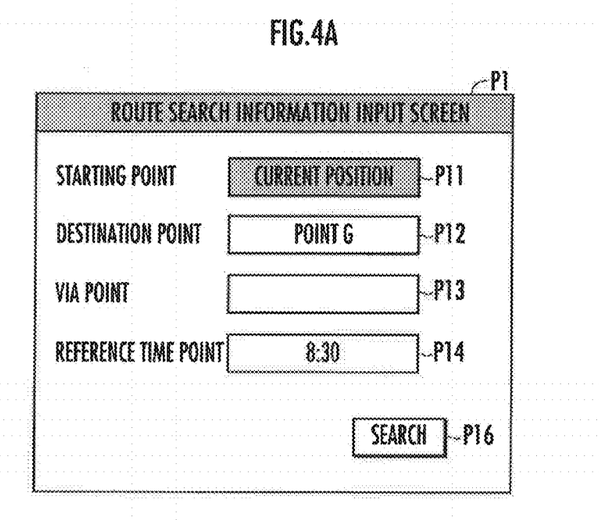
FIG. 4A is a view illustrating a configuration of a route search information input screen.

When the traffic information output app is activated, the input information recognition unit 212 of the client 20 outputs a route search information input screen P1 illustrated in FIG. 4A by referring to the display information 243 of the client storage unit 24 (STEP 210 in FIG. 3).

The route search information input screen P1 includes a starting point input box P11, a destination point input box P12, a via point input box P13, a reference time point input box P14, and a search button P16.

The starting point input box P11 is a box for accepting an input of information indicating the starting point (e.g., information capable of identifying the starting point, such as an address and a building name) and defaults to a value of "current position", whose background color is gray indicating that the input is invalid. If an input operation is sensed in the starting point input box P11, the input information recognition unit 212 changes the background color of the starting point input box P11 to white indicating that the input is valid and accepts an input of information indicating the starting point.

The destination point input box P12 is a box for accepting an input of information indicating the destination point (e.g., information capable of identifying the destination point, such as an address and a building name) and its background color is white indicating that the input is valid.

The via point input box P13 is a box for accepting an input of information indicating the via point (e.g., information capable of identifying the via point, such as an address and a building name) and its background color is white indicating that the input is valid.

The reference time point input box P14 is a box for accepting an input of information indicating the reference time point (start time point or arrival time point) and its background color is white indicating that the input is valid.

The search button P16 is a button for starting route search under the inputted condition.

The input information recognition unit 212 determines whether or not a pressing operation to the search button P16 is sensed in the client input device 22 (STEP 212 in FIG. 3).

If the determination result is negative (NO in STEP 212 in FIG. 3), the input information recognition unit 212 executes the process of STEP 212 in FIG. 3 again.

If the determination result is positive (YES in STEP 212 in FIG. 3), the input information recognition unit 212 recognizes the value entered in the destination point input box P12 and the via point input box P13 as the route determination information, and simultaneously recognizes the value entered in the reference time point input box P14 as the reference time point (STEP 214 in FIG. 3).

Note that for the sake of simplicity, the following description will focus on a case where a start time point is entered as the reference time point, but can be almost directly applied to a case where an arrival time point is entered. Note also that the initially entered reference time point is hereinafter referred to as "initial reference time point" as appropriate.

The moving cost prediction unit 213 searches for a plurality of routes with shorter distances based on the route determination information recognized in STEP 214 in FIG. 3 (STEP 216 in FIG. 3).

The moving cost prediction unit 213 predicts the moving cost of each area for each route according to the reference time point by referring to the change pattern 242 stored in the storage unit (STEP 218 in FIG. 3).

For example, the moving cost prediction unit 213 divides each route searched for into a plurality of areas for each predetermined distance. Then, the moving cost prediction unit 213 predicts a passage time point predicted from the reference time point and an average moving cost of the area at the passage time point as the prediction moving cost for each area by referring to the change pattern 242 stored in the storage.

The moving cost prediction unit 213 extracts a congestion area from each route based on the recognized moving cost (STEP 220 in FIG. 3).

For example, the moving cost prediction unit 213 extracts an area where the average moving cost is equal to or greater than a first congestion threshold value or the average speed at the passage time point is equal to or less than a second congestion threshold value, as the congestion area. The first congestion threshold value and the second congestion threshold value may be a predetermined value or may be an experimentally obtained value.

The moving cost prediction unit 213 recognizes a post-change reference time point having a change in moving cost in the congestion area by a post-change reference time point recognition process to be described later (STEP 222 in FIG. 3)

Figure 4B:
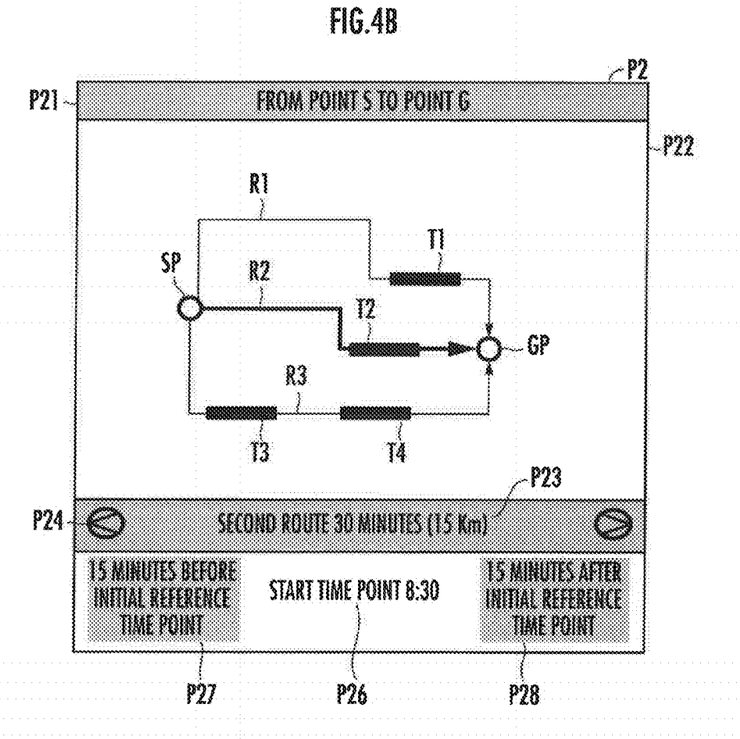
FIG. 4B is a view illustrating a configuration of a traffic information display screen.

The moving cost output control unit 214 outputs a traffic information display screen P2 including information indicating a moving cost predicted for each route and change time point interfaces P27 and P28 as illustrated in FIG. 4B by referring to the display information 243 of the client storage unit 24 (STEP 224 in FIG. 3).

As used herein, the traffic information display screen P2 includes a point display P21, a route display P22, a detailed route display P23, an alternative route selection buttons P24 and P25, a time point display P26, and change time point interfaces P27 and P28.

The point display P21 is a display indicating the starting point, the via point, and the destination point specified by the user. If the via point is not specified, the point display P21 displays no via point.

The route display P22 includes a starting point display SP which is a display of the starting point on the map, a destination point display GP which is a display of the destination point on the map, and route displays R1 to R3, each displaying a route connecting the starting point and the destination point.

Congestion area displays T1 to T4 are superimposedly displayed on each of the route displays R1 to R3. The congestion area displays T1 to T4 are displayed in a color such as red so as to be conspicuous and different from that of the other areas on the route.

When one of the route displays R1 to R3 is selected, the route display is conspicuously displayed such as by displaying the route in a color different from that of the other routes as illustrated by the route display R2 in FIG. 4B.

Note that a route having a minimum predicted moving cost (prediction moving cost) is initially selected and displayed.

The detailed route display P23 includes a display of a route name (such as a passing street name) and a display of the prediction moving cost of the entire route.

Each of the alternative route selection buttons P24 and P25 is a button associated with one of the other routes. When the pressing operation of the alternative route selection button P24 or P25 is sensed via the client input device 22, the moving cost prediction unit 213 highlights the route display corresponding to the button and displays the route name corresponding to the button and the prediction moving cost of the entire route on the detailed route display P23.

The time point display P26 is a display of the reference time point.

The change time point interfaces P27 and P28 are a display of information indicating the post-change reference time point recognized in STEP 222 in FIG. 3. In FIG. 4B, the change time point interface P27 is a display indicating the time point 15 minutes before the initial reference time point, and the change time point interface P28 is a display indicating the time point 15 minutes after the initial reference time point.

The input information recognition unit 212 determines whether the pressing operation of the change time point interface P27 or P28 is sensed or not via the client input device 22 (STEP 226 in FIG. 3).

If the determination result is positive (Yes in STEP 226 in FIG. 3), the input information recognition unit 212 recognizes the reference time point corresponding to the pressed change time point interface P27 or P28 (STEP 228 in FIG. 3). Then, based on the recognized reference time point, the moving cost prediction unit 213 executes the processes STEP 218 and steps thereafter in FIG. 3.

If the determination result is negative (No in STEP 2226 in FIG. 3), for example, if an operation to end the traffic information output app is performed via the client input device 22, the client computing device 21 ends the traffic information output process.

(Post-Change Reference Time Point Recognition Process)

Figure 5:
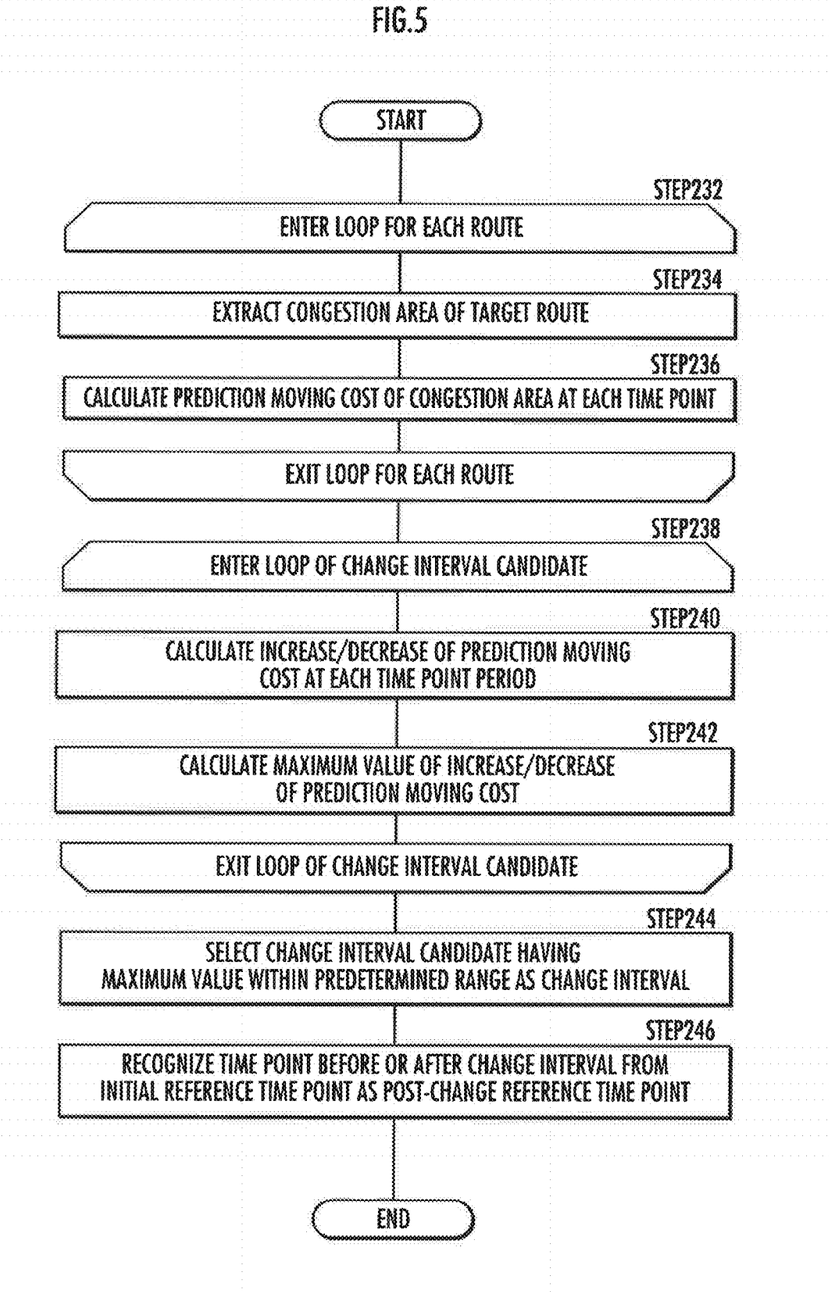
FIG. 5 is a flowchart of a post-change reference time point recognition process of a first embodiment.
Figure 6A:
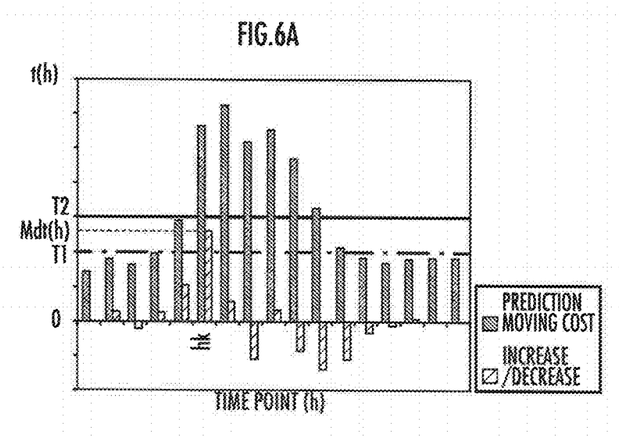
FIG. 6A is a supplementary view of the post-change reference time point recognition process of the first embodiment.

With reference to FIGS. 5 and 6A, the post-change reference time point recognition process of STEP 222 in FIG. 3 will be described.

The moving cost prediction unit 213 enters a loop for each route searched for, and executes the processes of STEP 234 in FIG. 5 and STEP 236 in FIG. 5 (STEP 232 in FIG. 5).

In STEP 234 in FIG. 5, the moving cost prediction unit 213 extracts congestion areas included in the target route. The congestion area extraction process is the same as that of STEP 220 in FIG. 3.

In STEP 236 in FIG. 5, the moving cost prediction unit 213 calculates a prediction moving cost $t(h)$ (e.g., mean or median value) for each congestion area at each time point $h$ by referring to the change pattern 242 stored in the client storage unit 24. This produces a graph, for example, plotting prediction moving costs t(h1) and t(h2) of congestion areas at each time point h1, h2, . . . as illustrated by right oblique lines in FIG. 6A.

Note that in FIG. 6A, the horizontal axis represents time point h, and the vertical axis represents the prediction moving cost t(h)(or an increase/decrease dt(h) thereof) of the target congestion section. The graph of right oblique lines represents a prediction moving cost t(h) required to pass through the congestion area, and the graph of left oblique lines represents an increase/decrease dt(h) of the prediction moving cost required to pass through the congestion area.

After the loop of STEP 232 in FIG. 5 ends, the moving cost prediction unit 213 enters a loop of a change interval candidate dh of the reference time point, and executes the processes of STEP 240 in FIG. 5 and STEP 242 in FIG. 5 (STEP 238 in FIG. 5). As used herein, the term "change interval candidate" refers to a change interval candidate of the reference time point such as "15 minutes before initial reference time point" and "15 minutes after initial reference time point" as illustrated in FIG. 4B. The expression "enter a loop of a change interval candidate" refers to repeating the process by increasing or decreasing a predetermined unit time (e.g., 2 minutes) from a predetermined start value (e.g., 5 minutes) until a predetermined condition is established or a predetermined end value is reached.

In STEP 240 in FIG. 5, the moving cost prediction unit 213 calculates an increase/decrease dt(h) of the prediction moving cost t(h) for each congestion area at each time point h regarding the target change interval candidate dh. For example, the moving cost prediction unit 213 calculates an increase/decrease dt(h) which is a difference between the prediction moving cost t(h) of a congestion area at a time point h and the prediction moving cost t(h+dh) of a congestion area at a next time point h+dh. This produces a graph plotting an increase/decrease dt(h) of the prediction moving cost of a congestion area at each time point h1, h2, . . . illustrated by left oblique lines in FIG. 6A.

In STEP 242 in FIG. 5, the moving cost prediction unit 213 calculates a maximum value of the increase/decrease t(h) of the prediction moving cost regarding the target change interval candidate dh. For example, in FIG. 6A, hk represents a maximum value Mdt(h) of an increase/decrease dt(hk) of the prediction moving cost.

After the loop of STEP 238 in FIG. 5 ends, the moving cost prediction unit 213 calculates a change interval candidate dh where the maximum value Mdt(h) of an increase or decrease of the prediction moving cost falls within a range (T1≤Mt≤T2, T1 denoting a first threshold value, and T2 denoting a second threshold value) in all congestion sections (STEP 244 in FIG. 5). The first threshold value T1 and the second threshold value T2 may be a predetermined value or may be a value specified by the user.

The moving cost prediction unit 213 recognizes the time point before or after the change interval candidate dh calculated from the initial reference time point as the post-change reference time point (STEP 246 in FIG. 5).

Operation and Effect of First Embodiment

The traffic information output system of the first embodiment allows the user of the traffic information output system to recognize the moving cost predicted according to the post-change reference time point by a simple method of shifting the reference time point by a specified time via the change time point interfaces P27 and P28. Thus, the traffic information output system of the first embodiment can reduce or eliminate the burden on the user when the searched route and the moving cost on the route are outputted.

The thus configured traffic information output system calculates the change interval so that the maximum value Mdt(h) of the increase/decrease dt(h) of the prediction moving cost is equal to or greater than the first threshold value T1 and recognizes the time point of the reference time point before or after the change interval as the post-change reference time point. This can avoid selecting a change interval with little change in moving cost.

The thus configured traffic information output system calculates the change interval so that the maximum value Mdt(h) of the increase or decrease dt(h) of the prediction moving cost is equal to or less than the second threshold value T2 and recognizes a time point of the reference time point before or after the change interval as the post-change reference time point. This can avoid selecting a change interval with violent fluctuations in the prediction moving cost t(h).

Second Embodiment

Figure 6B:
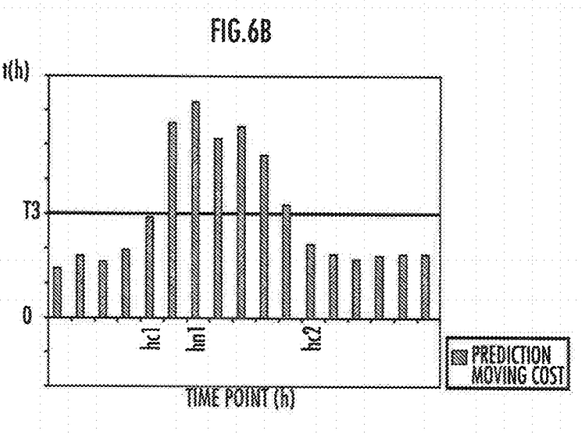
FIG. 6B is a supplementary view of a post-change reference time point recognition process of a second embodiment.
Figure 7:
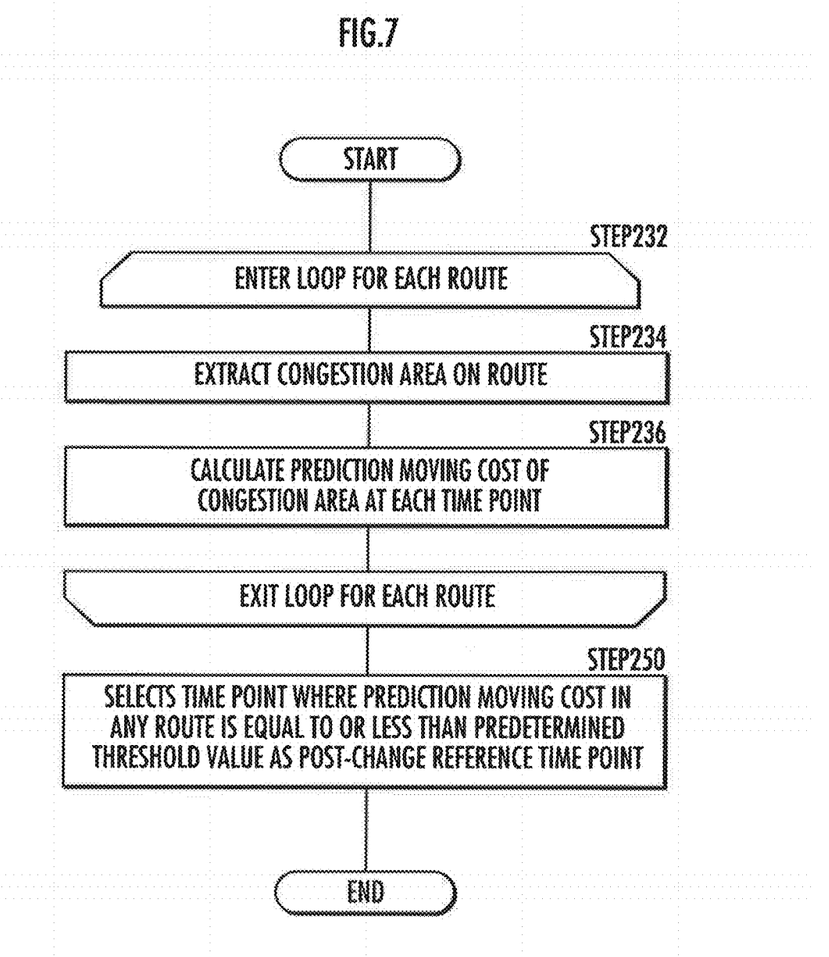
FIG. 7 is a flowchart of the post-change reference time point recognition process of the second embodiment.

With reference to FIGS. 6B and 7, the second embodiment of the traffic information output system of the present invention will be described. The traffic information output system of the second embodiment is the same as the traffic information output system of the first embodiment except part of the post-change reference time point recognition process. Note that in the traffic information output system of the second embodiment, the same reference numerals or characters are assigned to the same components and processes as those of the traffic information output system of the first embodiment and the description is omitted.

(Post-Change Reference Time Point Recognition Process)

The moving cost prediction unit 213 enters a loop for each route searched for, and executes the processes of STEP 234 in FIG. 7 and STEP 236 in FIG. 7 (STEP 232 in FIG. 7). The processes of STEP 234 in FIG. 7 and STEP 236 in FIG. 7 are the same as the processes of STEP 234 in FIG. 5 and STEP 236 in FIG. 5 in the first embodiment.

Based on the prediction moving cost of each congestion section at each time point for each route, the moving cost prediction unit 213 selects a time point closest to the initial reference time point out of the time points where a prediction moving cost of a congestion section in any route is equal to or less than a predetermined third threshold value as the post-change reference time point (STEP 250 in FIG. 7).

Note that the third threshold value may be a predetermined threshold value or may be a threshold value specified by the user.

Note that instead of selecting one post-change reference time point, the moving cost prediction unit 213 may select a time point closest to the initial reference time point out of the time points before the initial reference time point and a time point closest to the initial reference time point out of the time points after the initial reference time point as the post-change reference time point.

With reference to FIG. 6B, the description will focus on the process of STEP 250 in FIG. 7 taking an example of one congestion area. In FIG. 6B, the horizontal axis represents time point h, the vertical axis represents the prediction moving cost t(h) (or an increase/decrease dt(h) thereof), and the graph of right oblique lines represents a prediction moving cost t(h) required to pass through the congestion area. In FIG. 6B, hn1 denotes the initial reference time point, and T3 denotes the third threshold value.

Based on the graph in FIG. 6B illustrating the prediction moving cost t(h) of the target congestion section at each time point, the moving cost prediction unit 213 calculates time points hc1 and hc2 closest to the initial reference time point out of the reference time points where the prediction moving cost t(h) of the congestion section is equal to or less than the third threshold value T3.

Thus, the moving cost prediction unit 213 calculates a time point closest to the initial reference time point out of the reference time points where the prediction moving cost of the congestion area is equal to or less than the third threshold value for each congestion section. The moving cost prediction unit 213 selects the time point closest to the initial reference time point out of the time points calculated in all congestion sections as the post-change reference time point.

Operation and Effect of Second Embodiment

The thus configured traffic information output system can change the reference time point following the desire of the user desiring a change where the prediction moving cost is equal to or less than the third threshold value.

Third Embodiment

Figure 6C:
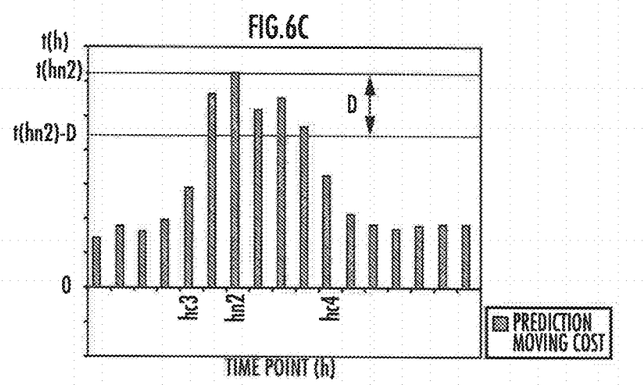
FIG. 6C is a supplementary view of a post-change reference time point recognition process of a third embodiment.
Figure 8:
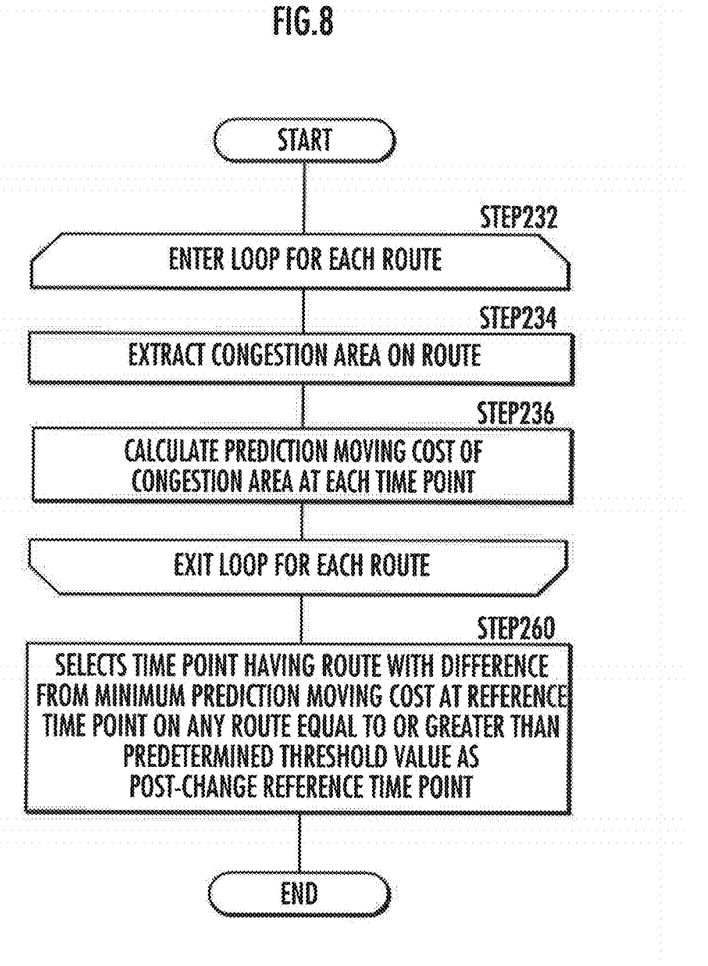
FIG. 8 is a flowchart of the post-change reference time point recognition process of the third embodiment.

With reference to FIGS. 6C and 8, the third embodiment of the traffic information output system of the present invention will be described. The traffic information output system of the third embodiment is the same as the traffic information output system of the first embodiment and the second embodiment except part of the post-change reference time point recognition process. Note that in the traffic information output system of the third embodiment, the same reference numerals or characters are assigned to the same components and processes as those of the traffic information output system of the first embodiment and the description is omitted.

(Post-Change Reference Time Point Recognition Process)

The moving cost prediction unit 213 enters a loop for each route searched for, and executes the processes of STEP 234 in FIG. 8 and STEP 236 in FIG. 8 (STEP 232 in FIG. 8). The processes of STEP 234 in FIG. 8 and STEP 236 in FIG. 8 are the same as the processes of STEP 234 in FIG. 5 and STEP 236 in FIG. 5 in the first embodiment.

The moving cost prediction unit 213 selects a time point having a route at the initial reference time point, which is equal to or less than the prediction moving cost obtained by subtracting a fourth threshold value from a minimum prediction moving cost out of the prediction moving cost of the congestion area of any route as the post-change reference time point (STEP 260 in FIG. 8). Note that instead of selecting one post-change reference time point, the moving cost prediction unit 213 may select a time point closest to the initial reference time point out of the time points before the initial reference time point and a time point closest to the initial reference time point out of the time points after the initial reference time point as the post-change reference time point.

Note that the fourth threshold value may be a predetermined threshold value or may be a threshold value specified by the user.

With reference to FIG. 6C, the description will focus on the process of STEP 260 in FIG. 8 taking an example of a congestion area having a minimum prediction moving cost at an initial reference time point hn2. In FIG. 6C, the horizontal axis represents time point h, the vertical axis represents the prediction moving cost t(h) (or an increase/decrease dt(h) thereof), and the graph of right oblique lines represents a prediction moving cost t(h) required to pass through the congestion area. In FIG. 6C, D denotes the fourth threshold value.

The moving cost prediction unit 213 calculates time points hc3 and hc4 equal to or less than a prediction moving cost t(hn2)-D obtained by subtracting the fourth threshold value D from the minimum prediction moving cost t(hn2) of the initial reference time point hn2 regarding the congestion section.

The moving cost prediction unit 213 calculates all time points equal to or less than the prediction moving cost t(hn2)-D obtained by subtracting the fourth threshold value D from the minimum prediction moving cost t(hn2) of the initial reference time point hn2 for each congestion section.

The moving cost prediction unit 213 selects a time point closest to the initial reference time point out of the time points calculated in all the congestion sections as the post-change reference time point.

Operation and Effect of Third Embodiment

The thus configured traffic information output system can change the reference time point following the desire of the user desiring a reduction in time.

(Modification)

The embodiments from the first embodiment to the third embodiment select the post-change reference time point based on the prediction moving cost or an increase/decrease of the prediction moving cost in the congestion section, but instead of this, may select the post-change reference time point based on the prediction moving cost or an increase/decrease of the prediction moving cost in all sections of the route.

According to the present embodiment, the client computing device 21 of the client 20 serves as the input information recognition unit 212, the moving cost prediction unit 213, and the moving cost output control unit 214, but instead may serve as some or all of the input information recognition unit 212, the moving cost prediction unit 213, and the moving cost output control unit 214 by allowing the server computing element 11 of the server 10 to execute a predetermined program and communicate with the client 20 as needed. In this case, some or all of the map information 241, the change pattern 242, and the display information 243 may be stored in the database 14 as needed.

If the past processing results are stored regarding the processes of STEP 232 to STEP 242 in FIG. 5, STEP 232 to STEP 236 in FIG. 7, and STEP 232 to STEP 236 in FIG. 8, the processing results can be read, and thus the processes of STEP 232 to STEP 242 in FIG. 5, STEP 232 to STEP 236 in FIG. 7, and STEP 232 to STEP 236 in FIG. 8 may be omitted.

In the first embodiment to the third embodiment, the change time point interfaces P27 and P28 are displayed by images. When the change time point interfaces P27 and P28 are pressed, the moving cost in the post-change reference time point is displayed. Alternatively or additionally to this, the moving cost output control unit 214 may allow a speaker or a microphone to serve as the change time point interface. More specifically, the moving cost output control unit 214 may be configured to output one or a plurality of post-change reference time points via a speaker, and then output the moving cost in the post-change reference time point based on the sound detected via the microphone of the client input device 22.

What is claimed is:

1. A traffic information output system comprising:
an input device and an output device;
a storage unit which stores a change pattern of a moving cost of a past moving cost;
an input information recognition unit which recognizes a reference time point and route determination information for determining a route, the reference time point and the route determination information being entered via the input device;
a moving cost prediction unit which predicts a moving cost of the route according to the reference time point indicated in the change pattern to generate a prediction moving cost; and
a moving cost output control unit which outputs, to the output device, the prediction moving cost and outputs a change time point indication for outputting a post-change prediction moving cost which is a moving cost predicted according to a post-change reference time point obtained by shifting the reference time point by a specified time,
wherein
the moving cost prediction unit calculates a change interval based on the change pattern so that a maximum value of an increase or decrease in prediction moving cost in some or all areas of the route is equal to or greater than a predetermined first threshold value, and
recognizes a time point which is the change interval earlier or later than the reference time point, as the post-change reference time point.

2. The traffic information output system according to claim 1, wherein
the moving cost prediction unit calculates a change interval based on the change pattern so that a maximum value of an increase or decrease in prediction moving cost which is a moving cost predicted in some or all areas of the route is equal to or less than a predetermined second threshold value and
recognizes a time point which is the change interval earlier or later than the reference time point, as the post-change reference time point.

3. The traffic information output system according to claim 1, wherein
the moving cost prediction unit is configured to recognize a time point closest to the reference time point out of the time points having a predetermined change in prediction moving cost in some or all areas of the route as the post-change reference time point.

4. The traffic information output system according to claim 3, wherein
the moving cost prediction unit selects a time point closest to the reference time point out of the time points where a prediction moving cost in some or all areas of the route is equal to or less than a predetermined third threshold value as the post-change reference time point based on the change pattern.

5. The traffic information output system according to claim 3, wherein
the moving cost prediction unit selects a time point closest to the reference time point out of the time points where a prediction moving cost in some or all areas of the route is reduced by a predetermined fourth threshold value or more as the post-change reference time point.

6. A traffic information output method executed by a traffic information output system comprising an input device, an output device, and a storage unit which stores a change pattern of a moving cost of a past moving cost, the traffic information output method comprising:
an input information recognition step of recognizing a reference time point and route determination information for determining a route, the reference time point and the route determination information being entered via the input device;
a moving cost prediction step of predicting a moving cost of the route according to the reference time point indicated in the change pattern to generate a prediction moving cost; and
a moving cost output control step of outputting, to the output device, the prediction moving cost and outputting a change time point indication for outputting a post-change prediction moving cost which is a moving cost predicted according to a post-change reference time point obtained by shifting the reference time point by a specified time,
wherein
the moving cost prediction step further comprises calculating a change interval based on the change pattern so that a maximum value of an increase or decrease in prediction moving cost in some or all areas of the route is equal to or greater than a predetermined first threshold value, and recognizing a time point which is the change interval earlier or later than the reference time point, as the post-change reference time point.

* * * * *